(12) United States Patent
Zimmet et al.

(10) Patent No.: US 8,671,408 B2
(45) Date of Patent: Mar. 11, 2014

(54) BLOCKING APPLICATIONS TO ENSURE TASK COMPLETION

(75) Inventors: Carol Sue Zimmet, Boxborough, MA (US); Colm Farrell, Clonsilla (IE); Liam Harpur, Skerries (IE); Patrick Joseph O'Sullivan, Ballsbridge (IE); Fred Raguillat, Dunboyne (IE)

(73) Assignee: International Business Machines Corporation, Armonk, NY (US)

( * ) Notice: Subject to any disclaimer, the term of this patent is extended or adjusted under 35 U.S.C. 154(b) by 1099 days.

(21) Appl. No.: 12/418,846

(22) Filed: Apr. 6, 2009

(65) Prior Publication Data

US 2010/0257526 A1    Oct. 7, 2010

(51) Int. Cl.
*G06F 21/00*    (2013.01)
(52) U.S. Cl.
USPC ............................................. 718/100
(58) Field of Classification Search
None
See application file for complete search history.

(56) References Cited

U.S. PATENT DOCUMENTS

| | | | |
|---|---|---|---|
| 2003/0046296 A1* | 3/2003 | Doss et al. | 707/102 |
| 2006/0190547 A1* | 8/2006 | Bhogal et al. | 709/207 |
| 2009/0063996 A1* | 3/2009 | Kristiansen et al. | 715/758 |

OTHER PUBLICATIONS

"WebEx Meeting Center, Tools for Managing the Meeting," http://nyee.edu/pdf/webex_best_practices.pdf, downloaded on Apr. 18, 2013, pp. 1-2.
"Microsoft Office Live Meeting, Add-In Pack User's Guide," http://www.intercall.ca/files/Live-MeetingAdd-InforOfficeUsersGuide_enc.pdf, downloaded on Apr. 18, 2013, pp. 1-19.

* cited by examiner

*Primary Examiner* — Robert Fennema
(74) *Attorney, Agent, or Firm* — Holland & Knight LLP; Brian J. Colandreo, Esq.; Jeffrey T. Placker, Esq.

(57) ABSTRACT

A method, computer program product, and computing system for providing a graphical user interface including at least one selectable application in a scheduling entry in the multi-user scheduling system. An available application lockout may be activated on all available applications other than a selected application upon initialization of the scheduling entry.

20 Claims, 5 Drawing Sheets

BLOCKING APPLICATIONS TO ENSURE TASK COMPLETION

BACKGROUND OF THE INVENTION

This disclosure relates to calendaring and scheduling systems and, more particularly, to methodologies for ensuring task completion in multi-user scheduling environments.

Calendaring and scheduling systems may allow workers or other users to schedule tasks, meetings, and events through entries in the system. In a multi-user scheduling system or other global environment, members of a team or other group may schedule tasks, meetings, and events to work collaboratively on a project. Each group member may have a number of collaborative tasks (i.e., a number of tasks where members work together on a project) and a number of individual tasks to complete on a given day or at a given time. Often times, collaborative tasks may take precedence over individual tasks, and the group member may have to work extra hours to complete individual tasks.

Additionally, the lure of collaborative tasks and the opportunity to communicate with others may cause the group member to procrastinate by responding to electronic mail (email), participating in blogs, wikis, discussion forums, or other collaborative activities, before ensuring his/her individual tasks are completed. Similarly, the lure of opening applications other than the ones necessary to complete tasks, such as internet browsers and games, may cause unnecessary distractions. Accordingly, these group members may need support from an application framework to ensure they have focus time to complete tasks.

BRIEF SUMMARY OF THE INVENTION

In a first implementation, a computer implemented method for ensuring task completion in a multi-user scheduling system may comprise providing a graphical user interface, at a client electronic device, including at least one selectable application in a scheduling entry in the multi-user scheduling system. The computer implemented method may further comprise activating an available application lockout, at the client electronic device, on all available applications other than a selected application upon initialization of the scheduling entry.

One or more of the following features may be included. The graphical user interface may include at least one selectable group member. A group member communication lockout on all available group members other than a selected group member may be activated, at the client electronic device, upon initialization of the scheduling entry. At least one group member may be alerted, via the client electronic device, of initialization of the scheduled entry. Moreover, at least one group member may be alerted, via the client electronic device, of inactivity on a task in the scheduling entry after a predefined time period of inactivity.

In some implementations, the available application lockout may be overridden upon activation of an application lockout override at the client electronic device. Furthermore, the group member communication lockout may be overridden upon activation of a group member communication lockout override at the client electronic device. A task completion selector for indicating when the task in the scheduling entry is complete may be provided at the client electronic device.

In another implementation, a computer program product may reside on a computer readable medium and have a plurality of instructions stored on it. When executed by a processor, the instructions may cause the processor to perform operations comprising providing a graphical user interface including at least one selectable application in a scheduling entry in the multi-user scheduling system. The computer program product may further comprise activating an available application lockout on all available applications other than a selected application upon initialization of the scheduling entry.

One or more of the following features may be included. The graphical user interface may include at least one selectable group member. A group member communication lockout on all available group members other than a selected group member may be activated upon initialization of the scheduling entry. At least one group member may be alerted of initialization of the scheduled entry. Moreover, at least one group member may be alerted of inactivity on a task in the scheduling entry after a predefined time period of inactivity.

In some implementations, the available application lockout may be overridden upon activation of an application lockout override. Furthermore, the group member communication lockout may be overridden upon activation of a group member communication lockout override. A task completion selector for indicating when the task in the scheduling entry is complete may be provided.

In another implementation, a computing system is provided. The computing system may include at least one processor and at least one memory architecture coupled with the at least one processor. The computing system may also include a first software module executed on the at least one processor and the at least one memory architecture, wherein the first software module is configured to provide a graphical user interface including at least one selectable application in a scheduling entry in the multi-user scheduling system. Additionally, the computing system may include a second software module configured to activate an available application lockout on all available applications other than a selected application upon initialization of the scheduling entry.

One or more of the following features may be included. A third software module may be configured to include in the graphical user interface at least one selectable group member. A fourth software module may be configured to activate a group member communication lockout on all available group members other than a selected group member upon initialization of the scheduling entry. Moreover, a fifth software module may be configured to alert at least one group member of initialization of the scheduled entry.

In some implementations, a seventh software module may be configured to override the available application lockout upon activation of an application lockout override. Further, an eighth software module may be configured to override the group member communication lockout upon activation of a group member communication lockout override.

The details of one or more implementations are set forth in the accompanying drawings and the description below. Other features and advantages will become apparent from the description, the drawings, and the claims.

DETAILED DESCRIPTION OF THE INVENTION

Figure 1:
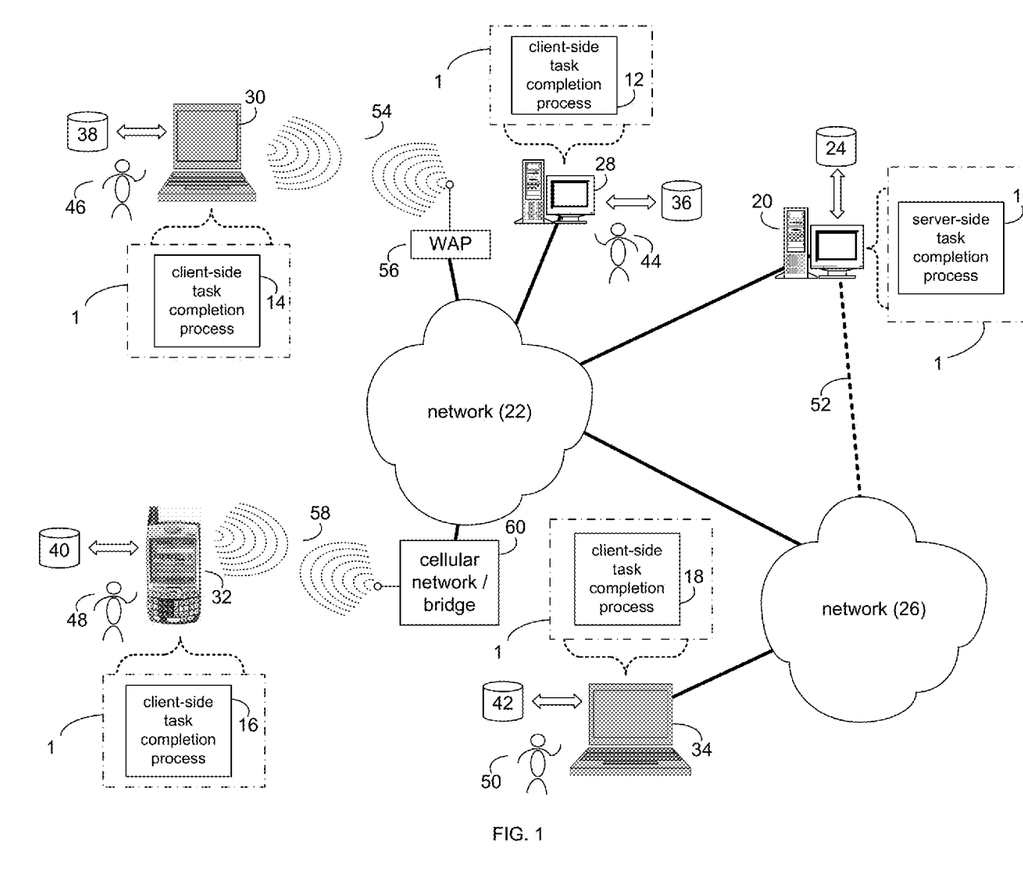
FIG. 1 is a diagrammatic view of a task completion process coupled to a distributed computing network.
Figure 2:
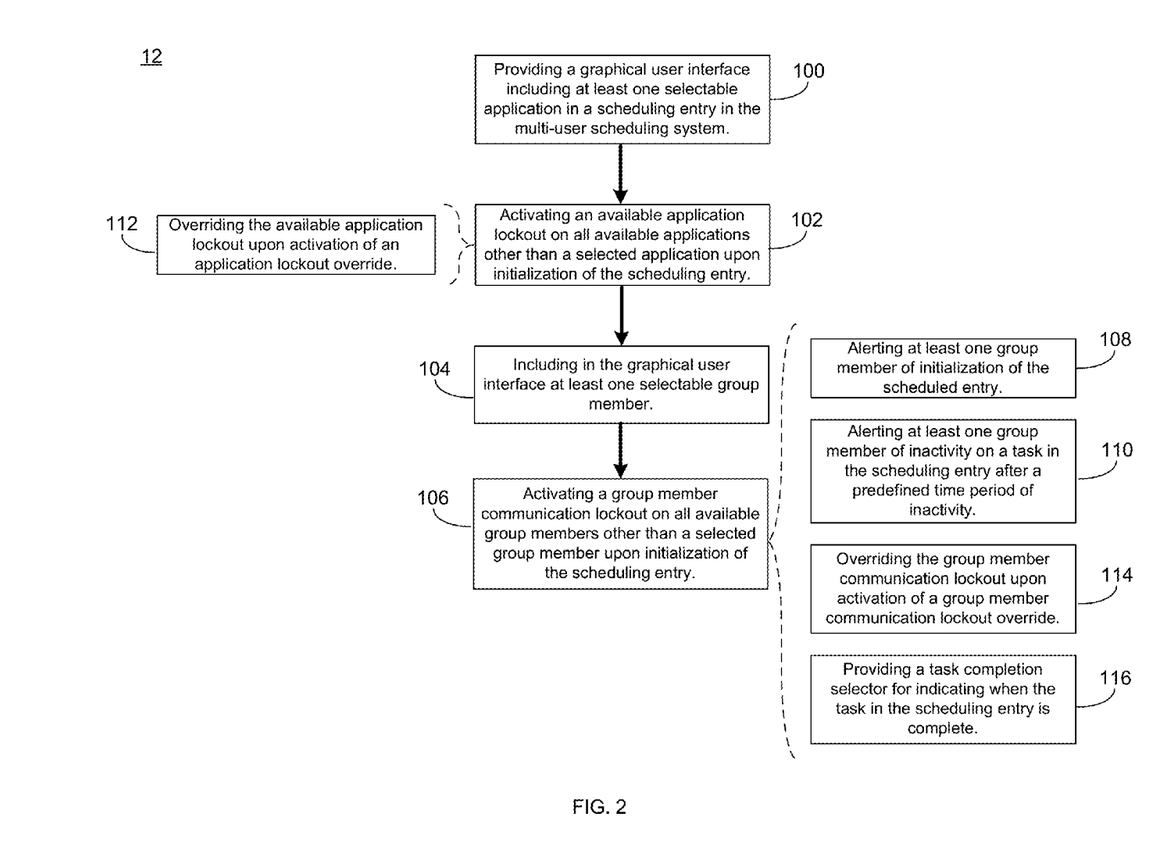
FIG. 2 is a flowchart of the task completion process of FIG. 1.

Referring to FIGS. 1 & 2, there is shown a task completion process 12. As will be discussed below, task completion process 12 may provide 100 a graphical user interface including at least one selectable application in a scheduling entry in a multi-user scheduling system. An available application lockout may be activated 102 on all available applications other than a selected application upon initialization of the scheduling entry.

The task completion process may be a server-side process (e.g., server-side task completion process 10), a client-side process (e.g., client-side task completion process 12, client-side task completion process 14, client-side task completion process 16, or client-side task completion process 18), or a hybrid server-side/client-side process (e.g., the combination of server-side task completion process 10 and one or more of client-side task completion process 12, 14, 16, 18).

Server-side task completion process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and a mainframe computer. Server computer 20 may be a web server (or a series of servers) running a network operating system, examples of which may include but are not limited to: Microsoft Windows XP Server™; Novell Netware™; or Redhat Linux™, for example.

The instruction sets and subroutines of server-side task completion process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft IIS™, Novell Webserver™, or Apache Webserver™, that allows for access to server computer 20 (via network 22) using one or more protocols, examples of which may include but are not limited to HTTP (i.e., HyperText Transfer Protocol), SIP (i.e., session initiation protocol), and the Lotus Sametime™ VP protocol. Network 22 may be connected to one or more secondary networks (e.g., network 26), examples of which may include but are not limited to: a local area network; a wide area network; or an intranet, for example.

Client-side task completion processes 12, 14, 16, 18 may reside on and may be executed by client electronic devices 28, 30, 32, 34 (respectively), examples of which may include but are not limited to personal computer 28, laptop computer 30, personal digital assistant 32, notebook computer 34, a data-enabled, cellular telephone (not shown), and a dedicated network device (not shown), for example. Client electronic devices 28, 30, 32, 34 may each be coupled to network 22 and/or network 26 and may each execute an operating system, examples of which may include but are not limited to Microsoft Windows™, Microsoft Windows CE™, Redhat Linux™, or a custom operating system.

The instruction sets and subroutines of client-side task completion processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Examples of client-side task completion processes 12, 14, 16, 18 may include but are not limited to a process incorporated into and executed within a client-side calendaring and scheduling application or other multi-user scheduling system (e.g., Microsoft Outlook™, Google Calendar™, Mozilla Thunderbird with Lightening™, and Apple iCal™ for Mac OS™), which allows for calendaring and/or scheduling entries and communication between a plurality of users (e.g., users 44, 46, 48, 50). Examples of server-side task completion process 10 may include but are not limited to a process incorporated into and executed within a server-side calendaring and scheduling application (e.g., Microsoft Outlook™, Google Calendar™, Mozilla Thunderbird™ with Lightening™, and Apple iCal™ for Mac OS™) Alternatively, client-side task completion processes 12, 14, 16, 18 and/or server-side task completion process 10 may be stand-alone applications that work in conjunction with (i.e., interface with) a client-side calendaring and scheduling application and/or a server-side calendaring and scheduling application (respectively). One or more of client-side task completion processes 12, 14, 16, 18 and server-side task completion process 10 may interface with each other (via network 22 and/or network 26) to allow a plurality of users (e.g., user 44, 46, 48, 50) to transmit calendaring and scheduling entries or invitations to participate in calendaring and scheduling entry tasks to each other.

Users 44, 46, 48, 50 may access server-side task completion process 10 directly through the device on which the client-side task completion process (e.g., client-side task completion processes 12, 14, 16, 18) is executed, namely client electronic devices 28, 30, 32, 34, for example. Users 44, 46, 48, 50 may access server-side task completion process 10 directly through network 22 and/or through secondary network 26. Further, server computer 20 (i.e., the computer that executes server-side task completion process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Personal digital assistant 32 is shown wirelessly coupled to network 22 via wireless communication channel 58 established between personal digital assistant 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Task Completion Process

For the following discussion, client-side task completion process 12 will be described for illustrative purposes. Client-side task completion process 12 may be incorporated into server-side task completion process 10 and may be executed within one or more client-side calendaring and scheduling applications (e.g., Microsoft Outlook™, Google Calendar™, Mozilla Thunderbird™ with Lightening™, and Apple iCal™ for Mac OS™) that allows for communication with client-side task completion process 12. However, this is not intended to be a limitation of this disclosure, as other configurations are possible (e.g., stand-alone, client-side conversation management processes and/or stand-alone server-side conversation management processes.) For example, some implementations may include one or more of client-side task completion processes 14, 16, 18 in place of or in addition to client-side task completion process 12.

The following discussion refers to group members, supervisors, managers, and users (e.g., user 44). Supervisors, managers, and users may all be group members. Group members may be, but are not limited to, members of any group, team, department, company, corporation, or organization. Group members may be employees, workers, colleagues, peers, or may be associated in any other professional or social way. Supervisors and managers may be responsible for the work product of group members, workers, employees, or each other. The hierarchies or relationships of group members, supervisors, managers, or other users in a group, team, department, company, corporation, or other organization may be identified by a Lightweight Directory Access Protocol (LDAP). The LDAP may include a number of policies regarding each group member and may include each group member's access rights to various functions and applications described herein. The hierarchies or relationships may also be drawn from a social network, or from social networking content (e.g., MySpace™, Facebook™, and LinkedIn™) Accessing rights, as discussed throughout this disclosure, may be created with or derived from the LDAP.

Further, organizations may have multiple levels of hierarchies. For example, an organization may have a corporate level, division level, geographically based levels, project levels, team levels, and individual levels. Access rights for group members in all of these levels may be drawn from the LDAP or social network. In other words, the LDAP directory specifications may identify hierarchies or relationships and access rights may be determined between all levels of the organization, at any organizational distance.

Figure 3:
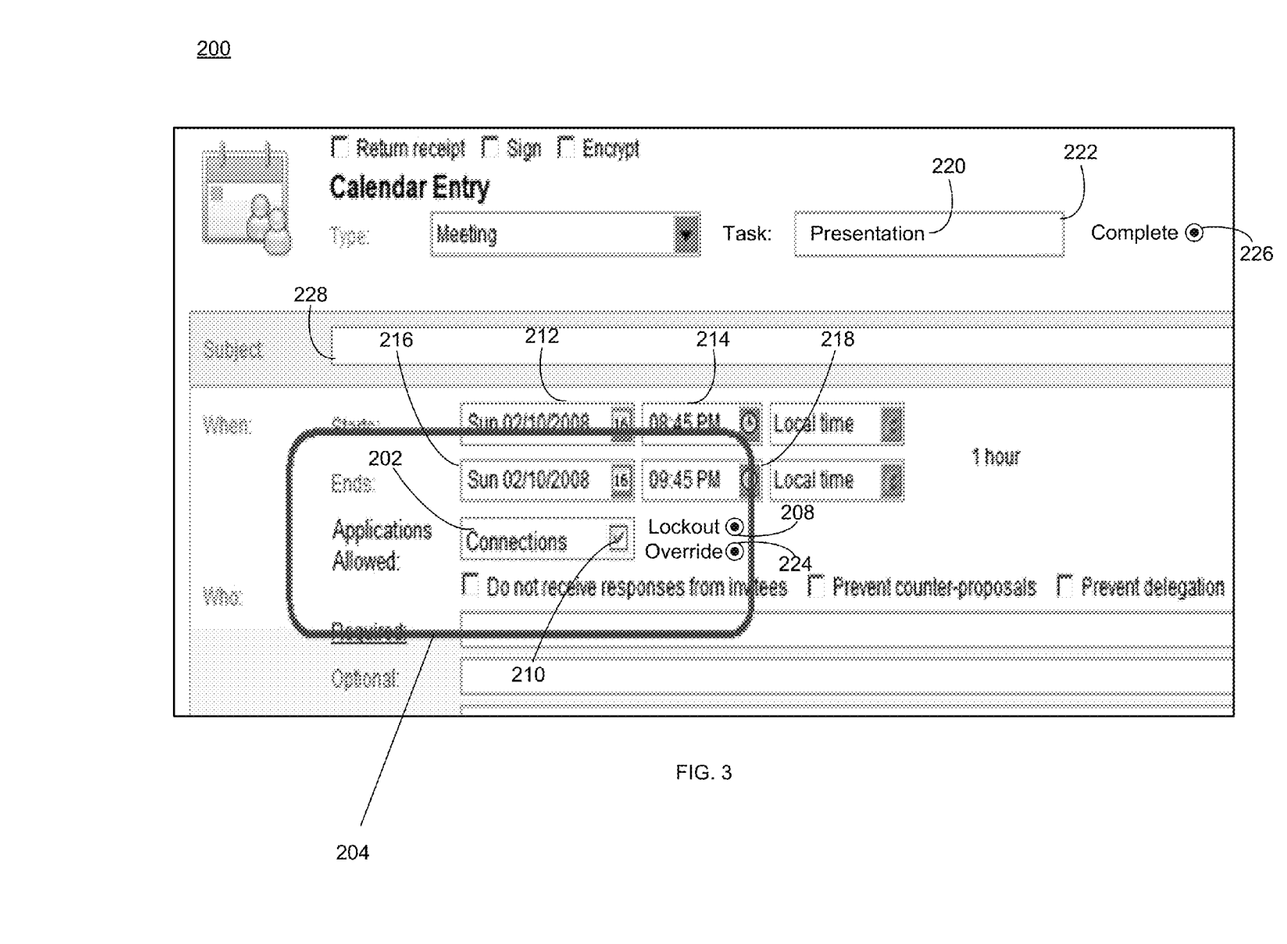
FIG. 3 is a diagrammatic view of a schedule entry rendered, at least in part, by the task completion process of FIG. 1.

Referring now to FIGS. 1, 2 & 3, client-side task completion process 12 may provide 100 graphical user interface 204 including at least one selectable application 202 in scheduling entry 200 in multi-user scheduling system 1. Graphical user interface 204 may represent an area of scheduling entry 200 that includes any number of user interface control elements for managing or controlling server-side task completion process 10 and/or client-side task completion process 12. Multi-user scheduling system 1 may be any calendaring and scheduling application and may include one or more of client-side task completion processes 12, 14, 16, 18 and server-side task completion process 10.

Graphical user interface 204 may include one or more user interface control elements including but not limited to check boxes, combo boxes, drop-down lists, grid views, list boxes, radio buttons, scrollbars, sliders, spinners, and, text boxes or any combination thereof. Graphical user interface 204 may also include any number of selectable applications as shown in list box 400 in FIG. 5a (e.g., selectable application 402). Selectable application 202 may be any software implemented application, hardware implemented application, or combination thereof. Examples of selectable application 202 include but are not limited to any word processing, spreadsheet, presentation, programming, web browsing, online chat, instant messaging, widget, database, blogging or web conferencing application.

Figure 5A:
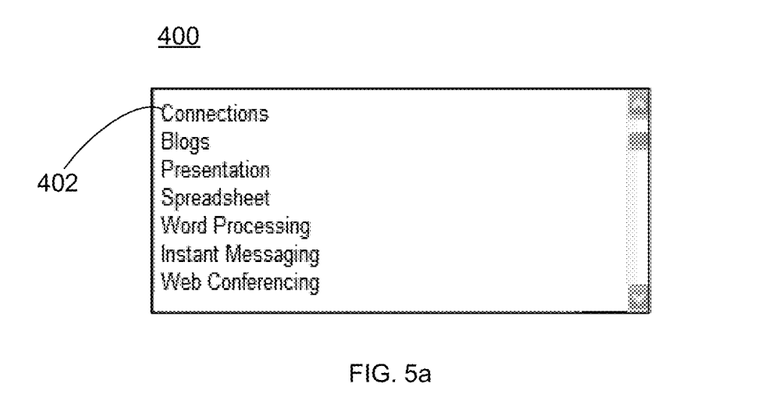
FIG. 5a is a diagrammatic view of a user interface control element.

A group member (e.g. user 44) may select any number of selectable applications, as shown in list box 400 in FIG. 5a. There may also be a "none" option for the group member to select. In this situation, the group member will not use any applications upon initialization of scheduling entry 200. Scheduling entry 200 may be an entry in any calendaring and scheduling application including but not limited to those mentioned above, or any calendaring and scheduling application configured to operate with graphical user interface 204. Scheduling entry 200 may also be referred to as a schedule entry, calendar entry, calendaring entry, or any combination thereof. It should be noted that the term "multi-user scheduling system" as used herein (e.g. multi-user scheduling system 1) may refer to any calendaring and scheduling application including, but not limited to, those mentioned above.

Available application lockout 208 may be activated 102 on all available applications other than selected application 210 upon initialization of scheduling entry 200. Once available application lockout 208 is activated, only selected applications may be available to the group member (e.g., user 44). A list of applications may be generated for all applications available at this time. Available application lockout 208 may be selected manually by the group member (e.g., user 44), by the group member's supervisor or manager, or automatically, any of which may be accomplished through client-side task completion process 12, server-side task completion process 10, or both. Scheduling entry 200 may be created by or may be accessed by any number of group members, supervisors, or managers with proper accessing rights in accordance with the LDAP. Scheduling entries as discussed throughout this disclosure may be created by group members for other group members and/or supervisors and/or managers, by supervisors for group members and/or managers, and by managers for group members and/or supervisors, in accordance with accessing rights. Scheduling entries may include members in teams across multiple levels of an organization according to hierarchies in the LDAP, and accessing rights determined there from. The hierarchies and accessing rights may be used to determine what each group member is permitted to do with respect to each function in the scheduling entry.

While available application lockout 208 is shown in FIG. 3 as a radio button, it may be of any configuration, such as any of the user interface control elements mentioned above. Further, activation of available application lockout 208 may be configured to occur automatically upon initialization of scheduling entry 200 without use of any user interface control element. The user interface control element (radio button) representing available application lockout 208 shown in FIG.

3 is an optional feature and available application lockout 208 may be implemented without use of any such feature.

When activated, available application lockout 208 may render any application configured to run on a client electronic device (e.g. client electronic devices 28, 30, 32, 34), other than a selected application (e.g., selected application 210) inaccessible. Available application lockout 208 may operate by freezing or terminating any application other than selected application 210. For example, if graphical user interface 204 includes at least three selectable applications (e.g. selectable application 202)—a word processing application, a spreadsheet application, and a presentation application (as shown in list box 400 in FIG. 5a), and the presentation application is selected (e.g., selected application 210), then available application lockout 208 may render the word processing application, the spreadsheet application, and any other selectable applications inaccessible. While selected application 210 is represented in FIG. 3 as a checkbox, it may be of any configuration, such as any of the user interface control elements mentioned above. Further, selection of selectable applications (e.g., selectable application 202) may be made by any number of group members, supervisors, or managers who have proper accessing rights to scheduling entry 200.

Scheduling entry 200 may be initialized at start date 212 and start time 214. Upon initialization of scheduling entry 200, available application lockout 208 may lockout all applications available to any number of designated group members, other than the selected applications (e.g., selected application 210), making them inaccessible to those group members. Scheduling entry 200 may terminate (i.e., close) at end date 216 and end time 218. At this time, all locked out applications may become available again. Start date 212, start time 214, end date 216, and end time 218 may be set by any number of group members, supervisors, or managers with proper accessing rights. Scheduling entry 200 may also be initialized and terminated at the occurrence of an event, or by command of a group member, supervisor, or manager, without respect to dates and times. Upon initialization of scheduling entry 200, selected applications, such as a presentation application, may be automatically launched, opened, and/or executed.

Continuing with the above example, if the presentation application is selected, the group member's email, instant messaging, and/or chat applications may be locked out. The group member may not have access to these applications, however others may still send email to the group member, or attempt to instant message or chat with the group member. Although locked out, the email, instant messaging, and/or chat applications may continue to receive and process messages for the group member, however they may or may not report or otherwise indicate to the group member that new messages have been received during the scheduling entry. The email, instant messaging, and/or chat applications may be configured to send an "away message" in response to any received messages. Further, for emails, instant messages, and/or chat sessions that are in progress when scheduling entry 200 is initialized, the email, instant messaging, and/or chat applications may be configured to terminate (i.e., close), send an "away message", or not receive incoming messages at all.

Figure 4:
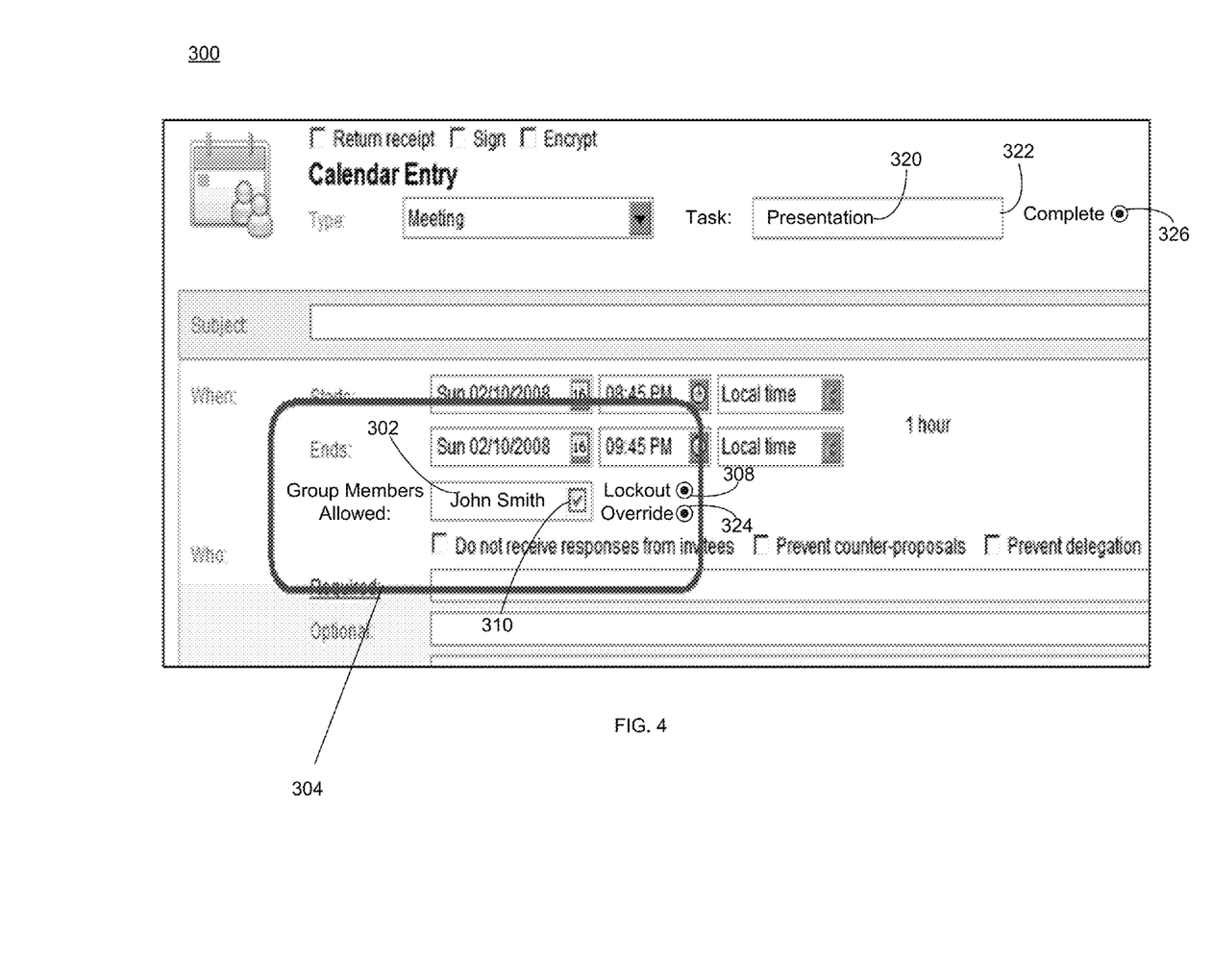
FIG. 4 is a diagrammatic view of a schedule entry rendered, at least in part, by the conversation management system of FIG. 1.

Referring now to FIGS. 1, 2 & 4, graphical user interface 304 may include 104 at least one selectable group member 302 in scheduling entry 300 in multi-user scheduling system 1. Graphical user interface 304 may represent an area of scheduling entry 300 that includes any number of user interface control elements for managing or controlling server-side task completion process 10 and/or client-side task completion process 12. Multi-user scheduling system 1 may be any calendaring and scheduling application and may include one or more of client-side task completion processes 12, 14, 16, 18 and server-side task completion process 10.

Figure 5B:
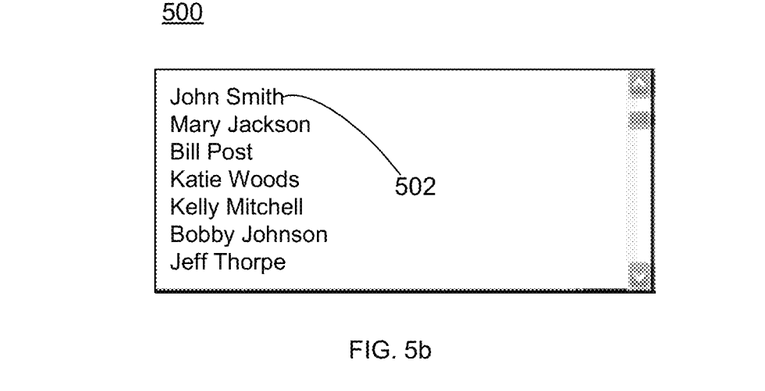
FIG. 5b is a diagrammatic view of a user interface control element.

Graphical user interface 304 may include any number of selectable group members, as shown in list box 500 in FIG. 5b (e.g., selectable group member 502). Selectable group member 302 may be any group member, supervisor, or manager. It should be noted that FIGS. 3 and 4, scheduling entries 200 and 300, and graphical user interfaces 204 and 304, respectively, are shown separately for illustrative purposes. Some embodiments may include the features of both graphical user interfaces 204 and 304 in one scheduling entry.

Group member communication lockout 308 may be activated 106 on all available group members other than selected group member 310 upon initialization of scheduling entry 300. Group member communication lockout 308 may be selected manually by a group member (e.g., user 44), by a group member's supervisor or manager, or automatically, any of which may be accomplished through client-side task completion process 12, server-side task completion process 10, or both. While group member communication lockout 308 is shown in FIG. 4 as a radio button, it may be any of the user interface control elements mentioned above. Further, activation of group member communication lockout 308 may be configured to occur automatically upon initialization of scheduling entry 300 without use of any user interface control element. The user interface control element (radio button) representing group member communication lockout 308 shown in FIG. 4 is an optional feature and group member communication lockout 308 may be implemented without use of any such feature.

When activated, group member communication lockout 308 may prevent any communication with all group members other than a selected group member (e.g. selected group member 310) and the group member creating scheduling entry 300. Group member communication lockout 308 may also prevent any communication between all group members other than a selected group member (e.g. selected group member 310) and a group member designated by another group member, supervisor, or manager with proper access rights. Group member communication lockout 308 may operate by preventing communication with the client electronic devices (e.g. client electronic devices 28, 30, 32, 34) of all group members other than the selected group member (e.g. selected group member 310), or by preventing selection of all group members other than the selected group member in, for example, email, instant messaging, chat, or web conferencing software, or any other communication software.

For example, if graphical user interface 304 includes at least three selectable group members (e.g. selectable group member 502 as shown in FIG. 5b)—John Smith, Mary Jackson, and Bill Post (as shown in FIG. 5b), and John Smith is selected (e.g., selected group member 310), then group member communication lockout 308 may prevent the creator of scheduling entry 300 or another designated group member from communicating with all group members other than John Smith. While selected group member 310 is represented in FIG. 4 as a checkbox, it may be any of the user interface control elements mentioned above. Further, selection of selectable group members (e.g., selectable group member 302) may be made by any number of group members, supervisors, or managers who have access to scheduling entry 300.

Continuing with the above example, if John Smith is selected, this may indicate that the group member who created scheduling entry 300 may want to chat, web conference, conference call, or otherwise communicate with John Smith upon initialization of scheduling entry 300. Accordingly, client-side task completion process 12 may ensure that John Smith is part of the chat session, web conference, or conference call associated with scheduling entry 300. Client-side task completion process 12 may also send an invitation to everyone listed in or associated with the scheduling entry.

Referring back to FIGS. 2 and 3, in some embodiments, client-side task completion process 12 may alert 108 at least one group member of initialization of scheduling entry 200. Client-side task completion process 12 may alert the creator of scheduling entry 200 or may alert any other group members designated by or associated with scheduling entry 200. If, for example, a number of group members were invited to participate in the task or subject of scheduling entry 200, or are otherwise involved in scheduling entry 200, they may be alerted of initialization of scheduling entry 200. Group members may be alerted of initialization of scheduling entry 200 through a popup window, audio, reminder, or any other alerting or alarming method. The popup window, for example, may be dismissed, snoozed for alert or alarm at a later period, or closed.

Further, client-side task completion process 12 may alert 110 at least one group member of inactivity on task 220 after a predefined period of inactivity. Task 220 may be any project, work, or other assignment given to a group member by another group member, a supervisor, or a manager. Task 220 may be entered in scheduling entry 200 in task entry box 222. Task 220 may also be entered in subject box 228, or may not be entered all. Task 220 may be set or entered by any group member, supervisor, or manager with proper access rights. The task (e.g., task 220) may require use of one or more available applications (e.g., selectable application 202). For example, if the task is "Presentation" (as shown in FIG. 3) it may require the use of a selectable application (e.g., selectable application 202) which may be, for example, presentation software. Task 220 may be defined by one or more selectable applications necessary to complete the task. If a group member who is associated with scheduling entry 200 does not have activity with the presentation software for fifteen minutes, for example, after initialization of scheduling entry 200, client-side task completion process 12 may alert 110 the group member of the inactivity. This may encourage the group member to work on task 220, and may help ensure that the group member completes task 220.

As stated above, inactivity may be measured with respect to one or more selectable applications necessary to complete the task. Additionally, inactivity may be measured by inactivity with a client electronic device, (e.g. client electronic devices 28, 30, 32, 34). Inactivity may also measured by inactivity with a mouse, keyboard, or other input for a client electronic device. Further, inactivity may be measured by lack of communication with a selectable group member (e.g., selectable group member 302 as shown in FIG. 4) through one or more means of communication, e.g., email, instant messaging, chat, or web conferencing software, or any other communication software. Moreover, the predefined period of inactivity may be set by any group member, supervisor, or manager, with proper access rights. The predefined period of inactivity may be entered into scheduling entry 200 or 300.

Referring back to FIGS. 2 and 3, client-side task completion process 12 may override 112 available application lockout 208 upon activation of application lockout override 224. Application lockout override 224 may be included in graphical user interface 204 in scheduling entry 200. Application lockout override 224 may also be included in a separate graphical user interface outside of scheduling entry 200. While application lockout override 224 is shown in FIG. 3 as a radio button, it may be any of the user interface control elements mentioned above. Further, application lockout override 224 may be activated by any group member, supervisor, or manager having access to scheduling entry 200. Upon activation of application lockout override 224, group members may regain access to locked out applications. Group members may regain access to locked out applications temporarily, for a predefined time period, or for the remainder of the duration of scheduling entry 200 (i.e., until scheduling entry 200 terminates).

For example, if a group member (e.g., user 44) is working on the task "Presentation" in scheduling entry 200, as shown in FIG. 3, the group member may be locked out of all applications other than presentation software, including an internet browser. If the group member needs access to the internet in order to make progress on the task "Presentation", the group member may activate application lockout override 224 in scheduling entry 200. Upon activation of application lockout override 224, the group member may regain access to locked out applications, such as an internet browser. Alternatively, the group member may activate application lockout override 224 from a graphical user interface outside of scheduling entry 200.

The group member's access rights to application lockout override 224 may be controlled by other group members or the group member's supervisor or manager. Further, the group member may be limited in the applications he/she may regain access to. Consider, in the previous example, a situation where the group member regains access to the internet browser application by activating application lockout override 224. Upon activation of application lockout override 224, the group member may also regain access to an instant messaging application, something his/her manager may not want. Accordingly, application lockout override 224 may be application specific, and may allow the group member to regain access to only one locked out application, or any number of locked out applications as determined by other group member's, a manager, or a supervisor.

In some situations, a group member may be working on an assignment that requires use of an application that will be locked out upon initialization of a scheduling entry. For example, the group member may be working on a word processing document in a word processing application as scheduling entry 200 is about to initialize. Upon initialization of scheduling entry 200, the group member may be locked out of the word processing application. Moreover, the word processing document may be extremely important and/or the group member may need additional time to complete the word processing document before scheduling entry 200 initializes and locks the group member out of the word processing application. In some embodiments, the group member may be allowed a grace period in order to finish the current assignment (i.e., the word processing document) in the application (i.e., the word processing application) by activating a delay, or snooze control, as mentioned above. When the group member is finished with the application, the group member may close out the application and the scheduling entry may be initialized for that group member, or the group member may otherwise join the scheduling entry.

Referring back to FIGS. 2 and 4, client-side task completion process 12 may override 114 group member communication lockout 308 upon activation of group member communication lockout override 324. Group member communication lockout override 324 may be included in graphical user interface 304 in scheduling entry 300. Group member communication lockout override 324 may also be included in a separate graphical user interface outside of scheduling entry 300. While group member communication lockout override 324 is shown in FIG. 3 as a radio button, it may be any of the user interface control elements mentioned above. Further, group member communication lockout override 324 may be activated by any group member, supervisor, or manager having access to scheduling entry 300. Upon activation of group member communication lockout override 324, a group member (e.g., user 44) may regain access to communication with locked out group members (i.e., group members with whom communication was prevented by activation of group member communication lockout 308). Group members may regain access to communication with locked out group members temporarily, for a predefined time period, or for the remainder of the duration of scheduling entry 300 (i.e., until scheduling entry 300 terminates).

For example, if a group member (e.g., user 44) is working on the task "Presentation" in scheduling entry 300, as shown in FIG. 4, the group member may be locked out of communication with all other group members besides John Smith. If the group member needs to communicate with another group member besides John Smith in order to make progress on the task "Presentation", the group member may activate group member communication lockout override 324 in scheduling entry 300. Upon activation of group member communication lockout override 324, the group member may regain communication with locked out group members, such as group member Mary Jackson (as shown in list box 502 in FIG. 5b). Alternatively, the group member may activate group member communication lockout override 324 from a graphical user interface outside of scheduling entry 300.

The group member's access rights to group member communication lockout override 324 may be controlled by other group members or the group member's supervisor or manager. Further, the group member may be limited in the group members he/she may regain access to communication with. Consider, in the previous example, a situation where the group member regains access to communication with group member Mary Jackson by activating group member communication lockout override 324. Upon activation of group member communication lockout override 324, the group member may also regain access to communication with group member Bill Post, something his/her manager may not want. Accordingly, group member communication lockout override 324 may be group member specific, and may allow the group member to regain access to communication with only one locked out group member, or any number of locked out group members as determined by other group members, a manager, or a supervisor.

Both application lockout override 224 and/or group member communication lockout override 324 may be activated automatically under a number of circumstances. For example, if scheduling entry 200 or 300 includes a conference call, online meeting, chat session, or web conference, and an important group member, supervisor, or manager is not able to attend, either override may be activated so that the remaining group members continue to have access to applications and communication. If the conference call, online meeting, chat session, or web conference is delayed then either override may be activated. Scheduling entries 200 and 300 may be cancelled or deleted by any group member, supervisor, or manager having proper access rights.

Referring back to FIGS. 2, 3, and 4, client-side task completion process 12 may provide 116 task completion selector 226 or 326 for indicating when task 220 or 320 in scheduling entry 200 or 300 is complete. Task completion selector 226 or 326 may be included in graphical user interface 204 or 304 in scheduling entry 200 or 300. Task completion selector 226 or 326 may also be included in a separate graphical user interface outside of scheduling entry 200 or 300. While task completion selectors 226 and 326 are shown in FIGS. 3 and 4 as radio buttons, they may be any of the user interface control elements mentioned above. Further, task completion selector 226 or 326 may be selected by any group member, supervisor, or manager having proper access rights to scheduling entry 200 or 300 to indicate that task 220 or 320 has been completed. Upon selection of task completion selector 226 or 326, a group member (e.g., user 44) may regain access to locked out applications and communication with locked out group members (i.e., group members with whom communication was prevented by activation of group member communication lockout 308). Also, selection of task completion selector 226 or 326 may cause scheduling entry 200 or 300 to end, or may otherwise terminate scheduling entry 200 or 300.

For example, if a group member (e.g. user 44) is working on the task "Presentation" in scheduling entry 200 or 300, as shown in FIGS. 3 and 4, and the group member completes the task "Presentation", the group member may select task completion selector 226 or 326. Selection of task completion selector 226 or 326 may indicate that task 220 or 320, or the task "Presentation" is complete. Moreover, selection of task completion selector 226 or 326 may trigger a message (i.e., an email or instant message) to be sent to another group member, a supervisor, or a manager, indicating that task 220 or 320 is complete.

It should be noted that graphical user interface 204 or 304 may represent an area of scheduling entry 200 or 300 that includes one or more of selectable application 202, selectable group member 302, available application lockout 208, group member communication lockout 308, selected application 210, selected group member 310, application lockout override 224, and group member communication lockout override 324. Graphical user interface 204 or 304 may also represent an area that additionally includes one or more of task 220, task 320, task entry box 222, task entry box 322, task completion selector 226, task completion selector 326, list box 400, or list box 500.

In some embodiments, the processes described above may be supported by a backbone framework. For example, server-side task completion process 10 and/or client-side task completion processes 12, 14, 16, 18 may be supported by a backbone framework which may include a central application invoker. The central application invoker may work in conjunction with a calendaring and scheduling application or a multi-user scheduling system. The central application invoker may only allow access to an application based on, at least in part, a set of rules for the application. The set of rules for the application may be derived from policies in the LDAP, social network, or from selections made in scheduling entries. Further, each application may be required to adhere to rules and agreements identified in scheduling entries with regard available applications, group member communication, lockouts, and overrides.

Additionally, server-side task completion process 10 and/or client-side task completion processes 12, 14, 16, 18 may include or use a registry system for applications. When an application is installed or upgraded, the registry system may make the application available for identification in a scheduling entry. Accordingly, when a group member (e.g., user 44) is creating a new scheduling entry, a list of installed or upgraded applications will appear and can be selected. Further, a list of allowed group members may be derived the LDAP or a social network and may appear and be selectable in a scheduling entry.

In one implementation, client-side task completion process 12 and/or server-side task completion process 10 may be executed within multiple calendaring and scheduling applications, which may be in communication at the same time. For example, different groups and teams or different organizations may use different calendaring and scheduling software, however they may desire to create scheduling entries involving group members of the different groups, teams, or organizations. For purposes of illustration only, if group A uses Microsoft Outlook™, and group B uses Google Calendar™, client-side task completion process 12 and/or server-side task completion process 10 may be implemented such that group members of groups A and B may send scheduling entries to each other via a gateway or other cross-environment connection. These scheduling entries may have the same effect on the group members and/or the client electronic devices as other scheduling entries described herein.

Continuing with the above example, and for illustrative purposes only, assume that group A is using Microsoft Outlook™, and that client-side task completion process 12 and/or server-side task completion process 10 is executed within. Also assume, for illustrative purposes only, that group B is using Google Calendar™, and that neither client-side task completion process 12 nor server-side task completion process 10 is executed within. In this situation, if a group member of group A sends a scheduling entry, as described herein, to a group member of group B, the scheduling entry may appear as it normally would and may be executed and/or may function without the features of client-side task completion process 12 and/or server-side task completion process 10. In other words, use of scheduling entries as described herein between calendaring and scheduling applications in groups running client-side task completion process 12 and/or server-side task completion process 10, and groups not running client-side task completion process 12 and/or server-side task completion process 10, may occur without impaired functionality.

Some of the embodiments described above may be implemented as software modules executed by a processor of a computing system, and/or in a computer program product that may be stored on a storage device, storage medium, or computer readable medium having instructions that when executed by a processor perform the task completion process described herein. The storage device, storage medium, or computer readable medium may include, but is not limited to, any type of disk including floppy disks, optical disks, compact disk read only memories (CD-ROMS), compact disk rewritables (CD-RWs), magneto-optical disks, semiconductor devices such as read-only memories (ROMs), random access memories (RAMs) such as dynamic and static RAMs, electronically erasable programmable read-only memories (EEPROMs), flash memories, magnetic or optical cards, or any type of media suitable for storing electronic instructions. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A computer implemented method for ensuring task completion in a multi-user scheduling system comprising:
providing a graphical user interface, at a client electronic device, including at least one selectable application in a scheduling entry in the multi-user scheduling system and a task entry field allowing for a user input to specify a task to complete, wherein the task is defined by the at least one selectable application necessary to complete the task; and
activating an available application lockout, at the client electronic device, on all available applications other than a selected application upon initialization of the scheduling entry.

2. The computer implemented method of claim 1 further comprising:
including in the graphical user interface at least one selectable group member; and
activating a group member communication lockout, at the client electronic device, on all available group members other than a selected group member upon initialization of the scheduling entry.

3. The computer implemented method of claim 2 further comprising:
alerting at least one group member, via the client electronic device, of initialization of the scheduled entry.

4. The computer implemented method of claim 2 further comprising:
alerting at least one group member, via the client electronic device, of inactivity on the task in the scheduling entry after a predefined time period of inactivity specified in the scheduling entry, wherein inactivity is measured by inactivity with the at least one selectable application necessary to complete the task.

5. The computer implemented method of claim 2 further comprising:
overriding the group member communication lockout upon activation of a group member communication lockout override at the client electronic device.

6. The computer implemented method of claim 2 further comprising:
providing, at the client electronic device, a task completion selector included in the scheduling entry for indicating when the task in the scheduling entry is complete.

7. The computer implemented method of claim 1 further comprising:
overriding the available application lockout upon activation of an application lockout override at the client electronic device.

8. A computer program product residing on a non-transitory computer readable medium having a plurality of instructions stored thereon, which, when executed by a processor, cause the processor to perform operations comprising:
providing a graphical user interface including at least one selectable application in a scheduling entry in the multi-user scheduling system and a task entry field allowing for a user input to specify a task to complete, wherein the task is defined by the at least one selectable application necessary to complete the task; and
activating an available application lockout on all available applications other than a selected application upon initialization of the scheduling entry.

9. The computer program product of claim 8 further comprising instructions for:
including in the graphical user interface at least one selectable group member; and
activating a group member communication lockout on all available group members other than a selected group member upon initialization of the scheduling entry.

10. The computer program product of claim 9 further comprising instructions for:
alerting at least one group member of initialization of the scheduled entry.

11. The computer program product of claim 9 further comprising instructions for:
  alerting at least one group member of inactivity on the task in the scheduling entry after a predefined time period of inactivity specified in the scheduling entry, wherein inactivity is measured by inactivity with the at least one selectable application necessary to complete the task.

12. The computer program product of claim 9 further comprising instructions for:
  overriding the group member communication lockout upon activation of a group member communication lockout override.

13. The computer program product of claim 9 further comprising instructions for:
  providing a task completion selector included in the scheduling entry for indicating when the task in the scheduling entry is complete.

14. The computer program product of claim 8 further comprising instructions for:
  overriding the available application lockout upon activation of an application lockout override.

15. A computing system comprising:
  at least one processor;
  at least one memory architecture coupled with the at least one processor;
  a first software module executed on the at least one processor and the at least one memory architecture, wherein the first software module is configured to provide a graphical user interface including at least one selectable application in a scheduling entry in the multi-user scheduling system and a task entry field allowing for a user input to specify a task to complete, wherein the task is defined by the at least one selectable application necessary to complete the task; and
  a second software module executed on the at least one processor and the at least one memory architecture, wherein the second software module is configured to activate an available application lockout on all available applications other than a selected application upon initialization of the scheduling entry.

16. The computing system of claim 15 further comprising:
  a third software module executed on the at least one processor and the at least one memory architecture, wherein the third software module is configured to include in the graphical user interface at least one selectable group member; and
  a fourth software module executed on the at least one processor and the at least one memory architecture, wherein the fourth software module is configured to activate a group member communication lockout on all available group members other than a selected group member upon initialization of the scheduling entry.

17. The computing system of claim 16 further comprising:
  a fifth software module executed on the at least one processor and the at least one memory architecture, wherein the fifth software module is configured to alert at least one group member of initialization of the scheduled entry.

18. The computing system of claim 16 further comprising:
  a sixth software module executed on the at least one processor and the at least one memory architecture, wherein the sixth software module is configured to alert at least one group member of inactivity on the task in the scheduling entry after a predefined time period of inactivity specified in the scheduling entry, wherein inactivity is measured by inactivity with the at least one selectable application necessary to complete the task.

19. The computing system of claim 16 further comprising:
  an eighth software module executed on the at least one processor and the at least one memory architecture, wherein the eighth software module is configured to override the group member communication lockout upon activation of a group member communication lockout override.

20. The computing system of claim 15 further comprising:
  a seventh software module executed on the at least one processor and the at least one memory architecture, wherein the seventh software module is configured to override the available application lockout upon activation of an application lockout override.

* * * * *